United States Patent [19]

Halter

[11] Patent Number: 4,711,747
[45] Date of Patent: Dec. 8, 1987

[54] METHOD OF PRODUCING BLOWN THERMOPLASTIC FOIL WITH LOW THICKNESS TOLERANCES

[75] Inventor: Hartmut Halter, Ruppichteroth, Fed. Rep. of Germany

[73] Assignee: Reifenhauser GmbH & Co., Troisdorf, Fed. Rep. of Germany

[21] Appl. No.: 865,170

[22] Filed: May 20, 1986

[30] Foreign Application Priority Data

May 21, 1985 [DE] Fed. Rep. of Germany ....... 3518155

[51] Int. Cl.⁴ .............................................. B29C 47/92
[52] U.S. Cl. .................... 264/40.2; 264/40.6; 264/564; 425/140; 425/143; 425/326.1
[58] Field of Search ...................... 264/40.6, 40.2, 564; 425/140, 141, 143, 144, 162, 170, 172, 326.1

[56] References Cited

U.S. PATENT DOCUMENTS

| | | | |
|---|---|---|---|
| 3,795,719 | 3/1974 | Morecroft et al. | 425/140 |
| 3,920,365 | 11/1975 | Mules | 425/141 |
| 3,974,248 | 8/1976 | Atkinson | 264/40.2 |
| 4,189,288 | 2/1980 | Halter | 425/72 R |
| 4,209,476 | 6/1980 | Harris | 425/140 |
| 4,325,897 | 4/1982 | Zerle et al. | 425/326.1 |
| 4,339,403 | 7/1982 | Upmeier et al. | 425/326.1 |
| 4,351,785 | 9/1982 | Upmeier et al. | 425/326.1 |
| 4,425,290 | 1/1984 | Upmeier | 425/326.1 |
| 4,464,318 | 8/1984 | Upmeier et al. | 425/326.1 |
| 4,488,861 | 12/1984 | Reifenhaüser | 264/40.6 |

FOREIGN PATENT DOCUMENTS

| | | | |
|---|---|---|---|
| 7701816 | 8/1978 | Netherlands | 264/40.6 |
| 1396164 | 6/1975 | United Kingdom . | |

Primary Examiner—Jeffery Thurlow
Attorney, Agent, or Firm—Karl F. Ross; Herbert Dubno

[57] ABSTRACT

A method of producing a thermoplastic foil with reduced thickness tolerances in which close to the head the temperatures of the mass flow emerging from the heat at various regions corresponding to tempering sectors are detected, the temperature measurements are averaged and the averages are used to form a set point value with which the individual averages are compared and the comparison used to generate a correction signal which is applied to the temperature controller of the respective sector.

10 Claims, 1 Drawing Figure

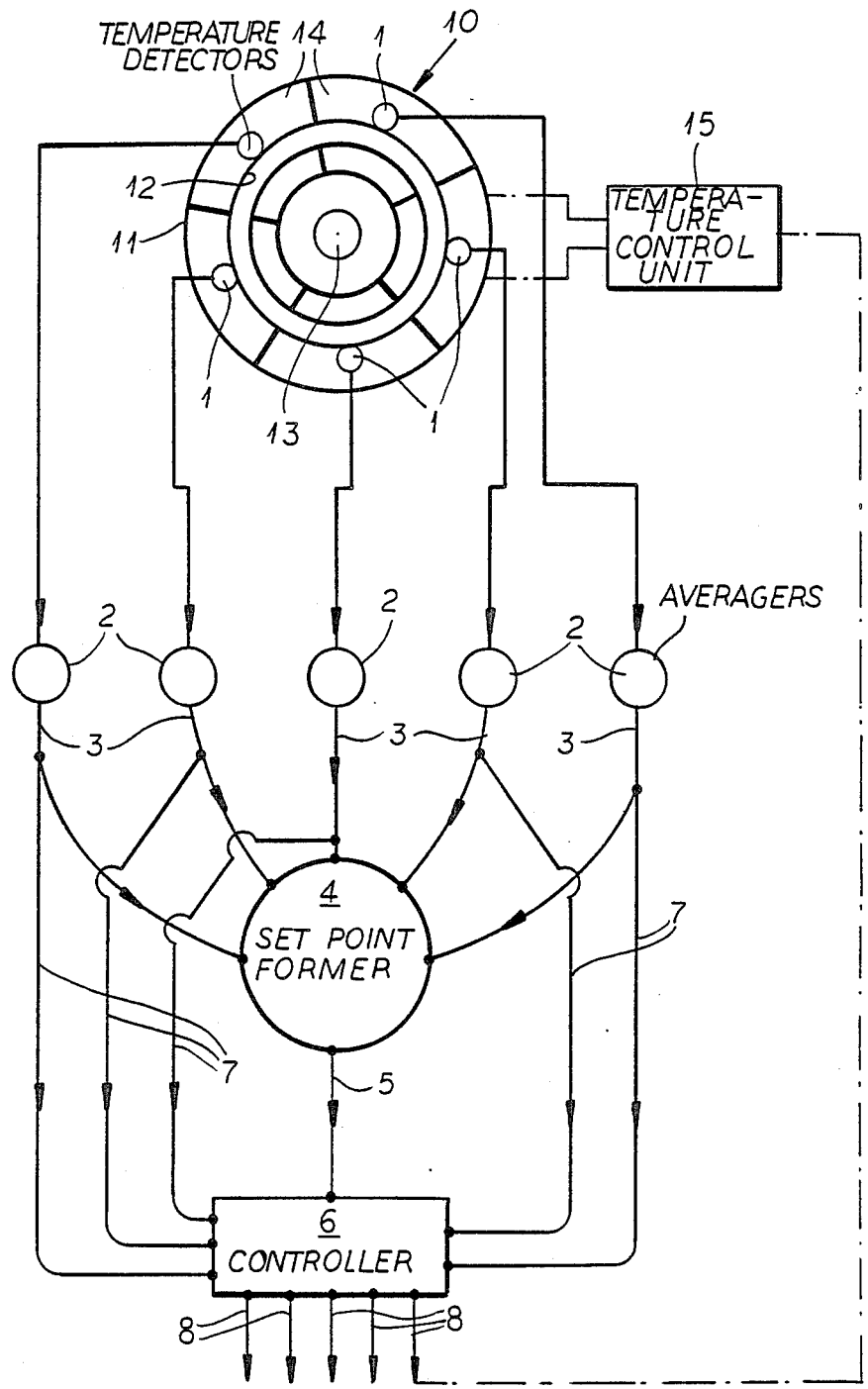

METHOD OF PRODUCING BLOWN THERMOPLASTIC FOIL WITH LOW THICKNESS TOLERANCES

FIELD OF THE INVENTION

My present invention relates to a method of making thermoplastic synthetic resin foil with low thickness tolerances using a foil-blowing extruder apparatus and, more particularly, to an improved method of controlling the thickness variation around the thin wall of a blown thin-wall tube to minimize that variation.

BACKGROUND OF THE INVENTION

In conventional foil-blowing apparatus, an extruder extrudes a continuous stream or strand of hot (molten) thermoplastic synthetic resin through an annular nozzle so that the tubular flow which emerges can be then expanded by blowing it, e.g. with air, to reduce the wall thickness and form a foil. The foil tube which is thereby produced, stabilizes upon cooling and can be collapsed and coiled, if desired.

The principles of such foil blowing of tubes and the general principles of control of the foil blowing process can be deduced from my commonly owned U.S. Pat. No. 4,189,288.

It is known that temperature deviations at various regions around the periphery of the mass flow of the synthetic resin material emerging from the annular nozzle can be compensated by subdividing the annular nozzle into a plurality of sectors which can be independently controllable as to temperature, these sectors being heated, cooled or selectively subjected to either a temperature raising or a temperature lowering operation.

In general this control is effected by measuring the wall thickness of the blown tube at different regions around its periphery and comparing these measurements with set point values, thereby generating error or control signals which can be used to regulate the temperature of the so called tempering sector.

The foil blowing head can rotate, can angularly oscillate or can be stationary.

The tempering sectors usually all have the same circumferential or arc length. They can be provided with heating and/or cooling devices (German patent document - Open Application - DE-OS No. 21 40 194). In addition, the blowing head can be provided with an autogeneous heat exchanger (German patent document - Open Application DE-OS No. 32 11 833), which can comprise an annular gap surrounding the blowing head axis and extending substantially parallel to the mass flow of the thermoplastic synthetic resin, the gap being partly filled with a heat exchange medium which is vaporizable or condensable at the operating temperature and is hermetically sealed.

Naturally the process with which the various regions of the mass flow can be controlled will increase with the number of sectors into which the annular nozzle is divided. Customarily four to eight sectors are provided.

In German patent document - Open Application DE-OS No. 30 02 293, there is described a control process in which a state parameter of the mass flow is measured, namely, the thickness of the foil tube, utilizing a thickness measuring device which is located downstream of the usual calibrating device and thus comparatively far from the annular nozzle and even from the expansion region of the apparatus. Such a thickness detector is likewise provided in the aforementioned U.S. patent.

As a consequence of the distance between the expansion region and the thickness measuring device or between the annular nozzle and the latter device, there is a significant response time between the initiation of a control operation and its measurable effect.

Furthermore, fluctuations between thickness maxima and thickness minima can be considerable in such control systems and thus around the circumference of the resulting foil the thickness tolerance is considerable. There is, furthermore, little capacity with the earlier systems to so coordinate the control of the individual sectors as to minimize the differences between thicknesses resulting at the various regions.

In the measurement techniques which have been used, the approach has generally been to utilize iterative or incremental elimination of a deviation from a set point value which, because of the response delay and the nature of such iterative or incremental approach to a set point value has made it difficult to obtain products with low thickness tolerances.

In fact, when rotary annular nozzles or angularly oscillating nozzles were employed, even the measurement of the thickness proved to be difficult and this was also the case because of interference with the thickness measurement by the means for the flattening of the foil tube.

OBJECTS OF THE INVENTION

It is the principal object of the present invention, therefore, to provide an improved method of producing a thermoplastic synthetic resin foil with reduced thickness tolerances and which permits a given thickness tolerance to be maintained reliably, even when there are tendencies for the thickness variations to be substantial.

Another object of this invention is to provide an improved method of producing thermoplastic synthetic resin foil with reduced thickness tolerances capable of compensating reliably for thickness defects which might otherwise arise and free from the drawbacks of earlier techniques.

SUMMARY OF THE INVENTION

These objects and others which will become apparent hereinafter are attained, in accordance with the invention, with a method of producing a thermoplastic synthetic resin foil with reduced thickness tolerances in which the state parameter of the mass flow which is measured is the temperature of the mass flow so that from averaging of temperature values for the regions of the mass flow corresponding to the tempering sectors, respective averages are provided and at least one of these averages or a summed or summation average formed from these individual averages is used as the set point value for the control device.

In other words around the circumference of the mass flow adapted to produce the synthetic resin foil, either as the mass flow emerges from the annular nozzle or along an expanding or expanded portion of this flow, the temperature at the various regions corresponding to the tempering sectors is measured.

Within the context of the invention, various averages may be used in the mathematical-static sense to form the average values mentioned. In general, however, I prefer to form the average values as simple arithmetic averages.

The electronic circuitry used for averaging the temperature values, however, can be provided with means for ascertaining a geometric average, a harmonic average or a mean square average utilizing, for example, squaring circuitry and the weighting of the averages, if such weighting is provided, can compensate for systematic defects which are associated with the particular construction of the foil blowing/extruder apparatus. Naturally, the average formation can be effected utilizing modern microprocessor technology.

The temperature measuring means can be applied to stationary foil blowing heads or even rotary or angularly oscillating foil blowing heads. With stationary foil blowing heads, respective temperature detectors can be provided for each tempering sector whereas with rotating heads, a single temperature detector which is synchronized with the rotation or angular oscillation of the head can scan the periphery of the mass flow and can signal the temperature at each sector.

As a consequence, the extruder apparatus can operate with an average value which remains sufficiently constant with time.

When a plurality of temperature sensors is provided, the latter can be provided as close to one another or as spaced from one another as may be desirable to obtain the desired degree of passage and resolution, the sensors being scanned by conventional electronic scanning techniques.

Thus the method of producing a thermoplastic synthetic resin foil with reduced thickness tolerances, comprises the steps of:

extruding a tubular stream of hot thermoplastic synthetic resin through an annular nozzle of a foil blowing head;

blowing the tubular stream emerging from the nozzle to expand the stream into a thin-wall foil tube and thereafter cooling the tube to stabilize the resulting foil;

subdividing the nozzle into a plurality of independently temperature controllable sectors around the periphery of the stream and the temperatures of which control at least in part the thickness of the foil tube in corresponding regions;

detecting the temperature of a mass flow of the hot thermoplastic synthetic resin emerging from the annular nozzle around the periphery of the mass flow;

averaging the temperature of the mass flow for specific regions thereof corresponding to the sectors to form respective average values;

forming a set point value from at least one of the average values;

comparing each of the average values with the set point value and generating a respective control signal for each sector upon deviation of the average values from the set point value; and controlling the temperature of each of the sectors with the respective control signals.

Surprisingly, the result is a highly precise control of thickness and especially small thickness tolerances not only around the periphery of the foiled tube and therefore across the breadth of the foil, but also along the length thereof. The deadtime by comparison with earlier systems is essentially small and when a large number of temperature detectors or temperature detections per unit of circumferential length of the mass flow are used, the drawbacks of earlier systems which can lead to widely different thickness maxima and minima around the periphery of the foil tube can be avoided.

When the foil blowing/extruder apparatus has tempering sectors which are each provided with a heating and a cooling unit, according to the invention, the set point value for all tempering sectors fed to the control unit can be a total average value or a summed average value.

When, however, the tempering sectors only have heating units, the average value supplied as the set point value should be the average value for the highest temperature detected of the regions associated with the sectors. Conversely, when the sectors have only cooling units, the average value which serves as the set point value, should be that associated with the lowest temperature of the regions.

Preferably, in accordance with this invention, the temperature of the mass flow is the integral wall temperature of the mass flow. This should be understood to mean the temperature of each element contributing to the thickness of the mass flow at each measuring location.

The integral temperature can be obtained by measuring, e.g. via infrared sensors, the infrared radiation from the wall. While this yields especially low tolerances, good results can also be obtained by measuring only the external surface temperature of the mass flow.

When one operates in accordance with the invention, the mass flow has over its entire circumference the same mean temperature and thus the same specific heat content. The mass flow can be rotationally symmetrically, fully uniform and can be blown to form the foil automatically with correspondingly homogeneous inner air pressure and air exchange in the foil bubble which is formed. This also contributes to the low thickness tolerances and, indeed, a thickness measuring device as described in the aforementioned U.S. Patent may no longer be necessary.

BRIEF DESCRIPTION OF THE DRAWING

The above and other objects, features and advantages of the present invention will become more readily apparent from the following description, reference being made to the accompanying drawing, the sole FIGURE of which is a diagram illustrating the control apparatus of the invention.

SPECIFIC DESCRIPTION

In the drawing I have shown in highly diagrammatic form a foil blowing head 10 which can be part of the apparatus shown in U.S. Pat. No. 4,189,288 for blowing thermoplastic foil, and which comprises an annular nozzle 11 through the annular slit 12 of which a mass flow of thermoplastic synthetic resin material can emerge, the blowing air being supplied through a passage 13. The nozzle 11 is subdivided into sectors 14 each of which can be heated and/or cooled by a temperature control unit, one of which has been shown at 15 although it will be understood that corresponding temperature control units are provided for each of the sectors.

Along the path of the mass flow, proximal to the head 10 and either in the immediate vicinity of the nozzle or at the expansion zone, a plurality of temperature sensors 1 can be mounted, each of which measures the temperature of the mass flowing in a region thereof corresponding to the respective sector 14.

Each of the temperature detectors 1, which can respond to infrared emerging from the synthetic resin material, is connected to a respective electronic averager 2 which delivers a signal representing the respective average values via line 3 to a set point former 4 which can select the highest average or the lowest average, depending upon whether the temperature controller 15 is only a heating or only a cooling unit, or which can form a summed average value. The set point value is supplied at 5 to a controller 6 which can be a microprocessor based comparator which compares the respective average (actual) value, delivered via lines 7 and corresponding to the individual sectors, with the set point value.

After set point/actual value comparison, a corresponding correction pulse is supplied via lines 8 to the respective temperature regulators 15.

Naturally, only a single temperature sensor need be provided if the head is rotated and here the temperature detector will be also connected to a single averager 2. The temperature detectors can switch into a single averager if a scanning operation is used as is conventional in multiplexing systems.

The state parameter of the mass flow which is measured, therefore, is the temperature and from the average temperature values for the individual sectors or at least one of these temperature averagers, the set point value for the controller 6 is formed.

I claim:

1. A method of producing a thermoplastic synthetic resin foil with reduced thickness tolerances, comprising the steps of:
   extruding a tubular stream of hot thermoplastic synthetic resin through an annular nozzle of a foil blowing head;
   blowing the tubular stream emerging from said nozzle to expand said stream into a thin-wall foil tube and thereafter cooling said tube to stabilize the resulting foil;
   subdividing said nozzle into a plurality of independently temperature controllable sectors around the periphery of said stream and the temperatures of which control at least in part the thickness of said foil tube in corresponding regions;
   detecting the temperature of a mass flow of the hot thermoplastic synthetic resin emerging from said annular nozzle around the periphery of said mass flow and at a location upstream of complete expansion of said tubular stream;
   averaging said temperature of said mass flow for specific regions thereof corresponding to said sectors to form respective average values;
   forming a set point value from at least one of said average values;
   comparing each of said average values with said set point value and generating a respective control signal for each sector upon deviation of said average values from said set point value; and
   controlling the temperature of each of said sectors with the respective control signals.

2. The method defined in claim 1 wherein the averaging of said temperature of said mass flow for specific regions thereof corresponding to said sectors to form respective average values forms arithmetic averages.

3. The method defined in claim 1 wherein the sectors are provided with means for selectively raising and lowering the temperatures of said sectors and said set point value is formed by summation of said average values.

4. The method defined in claim 1 wherein the sectors are provided exclusively with means for raising the temperatures of said sectors, said step of forming said set point value from at least one of said average values including ascertaining the highest temperature one of said specific regions and using the average value thereof as said set point value.

5. The method defined in claim 1 wherein the sectors are provided exclusively with means for lowering the temperature of said sectors, said step of forming said set point value from at least one of said average values including ascertaining the lowest temperature one of said specific regions and using the average value thereof as said set point value.

6. The method defined in claim 1 wherein the temperature of said mass flow of the hot thermoplastic synthetic resin emerging from said annular nozzle around the periphery of said mass flow is detected prior to the expansion of said stream.

7. The method defined in claim 1 wherein the temperature of said mass flow of the hot thermoplastic synthetic resin emerging from said annular nozzle around the periphery of said mass flow is detected in a region of expansion of said stream.

8. The method defined in claim 1 wherein the temperature of said mass flow of the hot thermoplastic synthetic resin emerging from said annular nozzle around the periphery of said mass flow is detected by measuring the integral wall temperature thereof.

9. The method defined in claim 1 wherein the temperature of said mass flow of the hot thermoplastic synthetic resin emerging from said annular nozzle around the periphery of said mass flow is detected by measuring the external surface wall temperature thereof.

10. The method defined in claim 1 wherein the temperature of said mass flow of the hot thermoplastic synthetic resin emerging from said annular nozzle around the periphery of said mass flow is detected by measuring infrared emissions therefrom.

* * * * *